(12) United States Patent
Miklòs et al.

(10) Patent No.: US 9,629,200 B2
(45) Date of Patent: Apr. 18, 2017

(54) CONTROLLING CONNECTION STATES OF A MOBILE TERMINAL BASED ON COMMUNICATION ACTIVITY

(75) Inventors: György Miklòs, Pilisborosjenö (HU); Johan Rune, Lindingö (SE); Joachim Sachs, Sollentuna (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 39 days.

(21) Appl. No.: 14/383,387

(22) PCT Filed: Mar. 7, 2012

(86) PCT No.: PCT/EP2012/053884
§ 371 (c)(1),
(2), (4) Date: Sep. 5, 2014

(87) PCT Pub. No.: WO2013/131562
PCT Pub. Date: Sep. 12, 2013

(65) Prior Publication Data
US 2015/0055573 A1 Feb. 26, 2015

(51) Int. Cl.
*H04W 76/06* (2009.01)
*H04L 29/06* (2006.01)
(52) U.S. Cl.
CPC ........... *H04W 76/068* (2013.01); *H04L 65/80* (2013.01)
(58) Field of Classification Search
None
See application file for complete search history.

(56) References Cited

U.S. PATENT DOCUMENTS

| 9,253,776 | B2* | 2/2016 | Huang | H04W 72/0446 |
| 9,307,569 | B2* | 4/2016 | Kodali | H04W 76/046 |
| 2002/0172178 | A1* | 11/2002 | Suzuki | H04W 76/068 370/338 |
| 2005/0063304 | A1 | 3/2005 | Sillasto et al. | |
| 2005/0192046 | A1* | 9/2005 | Harris | H04W 8/22 455/552.1 |
| 2008/0045267 | A1* | 2/2008 | Hind | H04L 51/14 455/557 |
| 2010/0144363 | A1 | 6/2010 | De Rosa et al. | |
| 2012/0137217 | A1* | 5/2012 | Amsterdam | G06F 1/3228 715/256 |

(Continued)

FOREIGN PATENT DOCUMENTS

EP 1482691 A1 12/2004
JP 08008995 A * 1/1996

*Primary Examiner* — Hassan Kizou
*Assistant Examiner* — Deepa Belur
(74) *Attorney, Agent, or Firm* — Patents on Demand P.C.; Brian K. Buchheit; Scott M. Garrett

(57) ABSTRACT

The invention refers to controlling a connection of a terminal (102, 202, 402) being attached to a communication network (100, 200, 300, 400), wherein a connectivity change from a connected mode into a non-connected mode is performed as a result of monitoring a data transmission activity with respect to the terminal, comprising obtaining an inactivity timeout value according to specific information associated to the terminal, and changing the connectivity from the connected mode into the non-connected mode if a monitored time without data transmission activity exceeds the obtained inactivity timeout value.

17 Claims, 5 Drawing Sheets

(56) References Cited

U.S. PATENT DOCUMENTS

| | | | |
|---|---|---|---|
| 2012/0140355 A1* | 6/2012 | Carter | G11B 19/2072 360/73.01 |
| 2012/0281561 A1* | 11/2012 | Shukla | H04W 76/068 370/252 |
| 2013/0130693 A1* | 5/2013 | Salvador | H04W 48/20 455/437 |
| 2014/0293857 A1* | 10/2014 | Dalsgaard | H04W 52/0222 370/311 |
| 2015/0237622 A1* | 8/2015 | Huang | H04W 72/0446 455/452.1 |

* cited by examiner

CONTROLLING CONNECTION STATES OF A MOBILE TERMINAL BASED ON COMMUNICATION ACTIVITY

CROSS REFERENCE TO RELATED APPLICATION(S)

This application is a 35 U.S.C. §371 National Phase Entry Application from PCT/EP2012/053884 filed Mar. 7, 2012, the disclosure of which is incorporated by reference.

TECHNICAL FIELD

The invention relates to a method of controlling connectivity states, a node of a communication network for controlling the connectivity states, and a computer program thereto.

BACKGROUND

Recent cellular standards, e.g. 3GPP standardized Long Term Evolution (LTE) radio access, provide for releasing a bearer (or a data connection) between a terminal and the network after a predefined time of data inactivity. According to LTE, a terminal is set from connected mode to idle mode after detecting that a monitored inactivity time (wherein no data has been exchanged) exceeds a predefined inactivity timeout value set in an eNode B of the LTE network. In such a case, the eNode B initiates the bearer release such that the connectivity state or operational state with respect to the terminal is changed from connected to idle. Thereto, the eNode B commands a control node of the communication network, for example a Mobility Management Entity (MME) to release access bearer(s) of the terminal and a terminal context of the terminal. For example, if the inactivity timeout value is set to 60 seconds, all terminals showing data traffic inactivity exceeding 60 seconds are put to idle state.

However, such preconfigured timeout value might not be suitable for all terminals of the network. Assuming a machine device terminal with short data traffic periods, the typical value of 60 seconds for the inactivity timeout value may be too high, since the terminal is kept in its connected state although it will be inactive most of the time staying in connected mode. This might lead to an unnecessary consumption of power, since power consumption in the connected state of the terminal is typically significantly higher than a power consumption in the idle state of the terminal. On the other hand, users might seek a longer timeout value, e.g. if a response time shall be minimum and/or if a data throughput shall be maximum in any conditions.

SUMMARY

It is an object of the present invention to provide an improved control of connectivity states with respect to a mobile terminal.

This object is achieved by the independent claims. Advantageous embodiments are described in the dependent claims.

According to an embodiment, a controlling a connection of a terminal being attached to a communication network is proposed, wherein a connectivity (or operational state) change from a connected mode into a non-connected mode is performed as a result of monitoring a data transmission activity with respect to the terminal, comprising obtaining an inactivity timeout value according to specific information associated to the terminal, e.g. information being received from the terminal and/or information being stored with respect to the terminal, and changing the connectivity from the connected mode into the non-connected mode if a monitored time without data transmission activity exceeds the obtained inactivity timeout value.

According to an embodiment, two alternatives of obtaining the timeout values are provided. In a first alternative, the timeout value is determined irrespective of any specific information about the terminal and in as second alternative, the timeout value is determined in dependency on the specific information. Selecting one out of both alternatives is determined based on control information received or kept stored.

According to an embodiment, changing the connectivity from the connected mode into the non-connected mode comprises releasing one or a plurality of data bearers between the terminal and the communication network. Further, a release message might be sent to the terminal so that the terminal may change its state from connected mode to idle mode.

According to an embodiment, the inactivity timeout value is adapted or modified in dependency on the monitored data transmission activity with respect to the terminal. The inactivity timeout value might be adapted, if one of the following conditions is met:

a connectivity change back to the connected mode with respect to the terminal within a first verification time period after the connectivity has changed from the connected mode to the non-connected mode, and no connectivity change back to the connected mode with respect to the terminal within a second verification time period after the connectivity has changed from the connected mode to the non-connected mode.

Modifying or adapting the inactivity timeout value comprises increasing the inactivity timeout value if the connectivity change back has been detected (and if the value is below a maximum threshold), and decreasing the inactivity timeout value if the connectivity change back has not been detected (and if the value is above a minimum threshold).

The specific information associated to the terminal is information might comprise a data transmission and/or reception capability, a subscription information associated to the terminal, e.g. a granted quality of service, a data transmission and/or reception configuration, a power capability, and a power configuration.

According to an embodiment, terminals are grouped into different terminal classes according to a technical capability, a configuration and/or a subscription associated to the terminal, wherein the specific information is common for all terminals grouped into one terminal class, and wherein the inactivity timeout value is determined based on an obtained terminal class, the terminal belongs to.

According to an embodiment, a data traffic scheme is detected based on the monitored data traffic. According to an embodiment thereto, detecting the scheme might comprise detecting first periods or data traffic events with more frequent data traffic occurrences followed each by second periods (inactivity times) without any data traffic occurrence), wherein the inactivity timeout value is determined in dependency on the detected data traffic scheme. Thereto, the timeout value might be determined to be equal or higher than a maximum measured time between an occurrence of any consecutive data packets within the data traffic event. Alternatively the timeout value might be chosen to be higher or equal than any of a subset of measured time values between occurrences of consecutive packets of the event (e.g. to exclude spikes), or to be any value calculated from such measured time values (e.g. an average value).

According to an embodiment, a node for controlling a connection with respect a terminal being attached to a communication network according to the preceding embodiments is proposed.

The present invention also concerns a computer program comprising portions of software codes in order to implement the method as described above when operated by a respective processing unit of a user device and a recipient device. The computer program can be stored on a computer readable medium. The computer-readable medium can be a permanent or rewritable memory within the user device or the recipient device or located externally. The respective computer program can be also transferred to the user device or recipient device for example via a cable or a wireless link as a sequence of signals.

Further embodiments of the method, the node, and the computer program are defined in the dependent claims.

In the following, detailed embodiments of the present invention shall be described in order to give the skilled person a full and complete understanding. However, these embodiments are illustrative and not intended to be limiting.

BRIEF DESCRIPTION OF THE DRAWINGS

Embodiments of the invention will be described in more detail hereinafter with reference to examples, but to which the scope of the invention is not limited.

DETAILED DESCRIPTION

Figure 1:
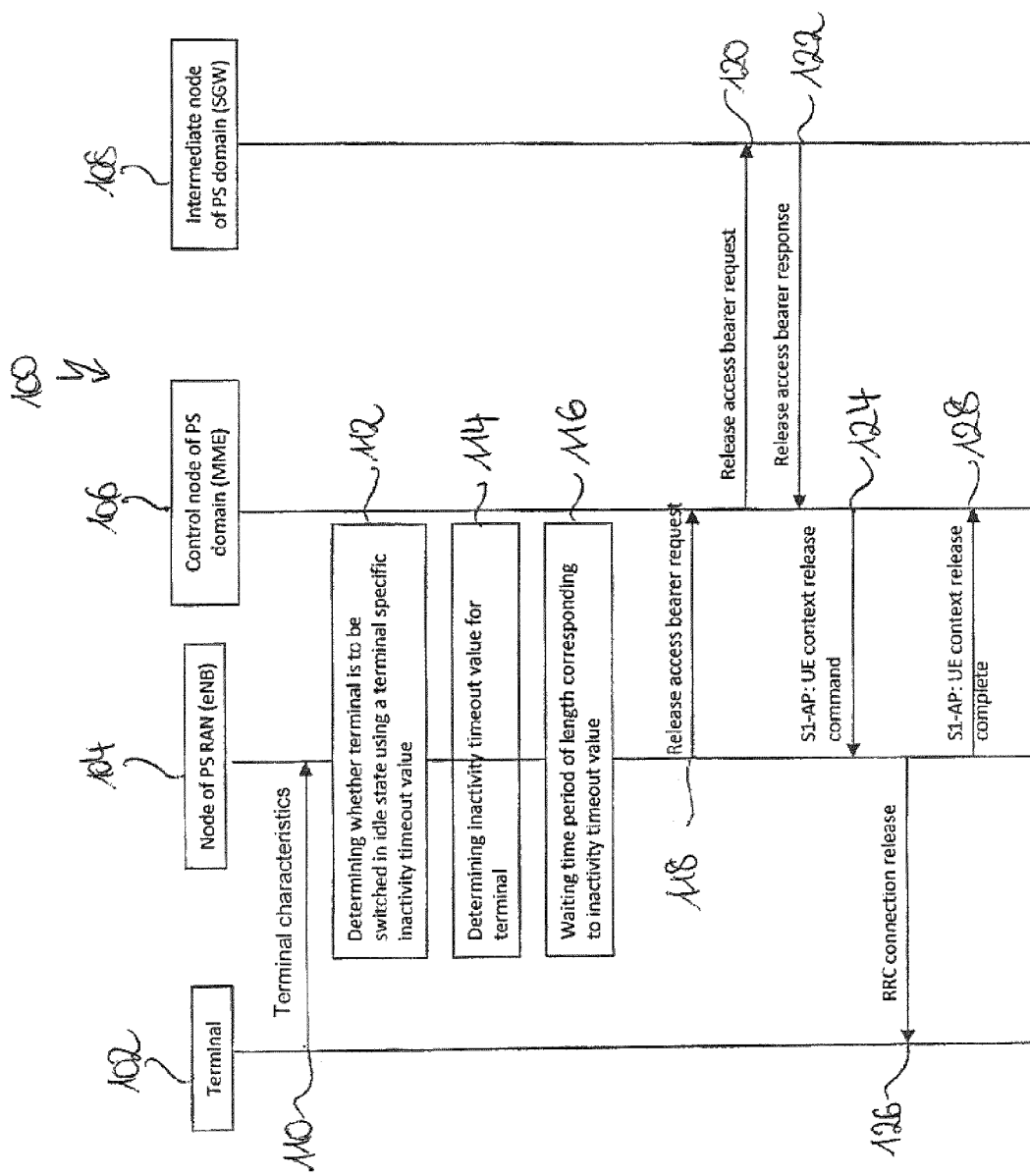
FIG. 1 shows a flow diagram illustrating a method of controlling operational states of a terminal according to a first exemplary embodiment of the invention.

The illustration in the drawings is schematic. It is noted that different or identical elements and steps in the drawings are provided with the same reference sign or with reference signs which are different within the first digit.

In the following, the method of controlling operational states of a terminal, the node of the communication network for controlling operational states of a terminal, and the computer program according to the exemplary aspects of the invention will be explained in more detail.

Within the context of the present application, the term "terminal specific inactivity timeout value" may in particular denote an inactivity timeout value which may be defined for or may depend on an individual terminal or terminals of a particular type. In particular, the terminal may switch from its connected state to its idle state based on the inactivity timeout value, for example after an elapse of a time period comprising a time length corresponding to the inactivity timeout value.

The term "connected state" of the terminal may particularly denote a state of the terminal in which the terminal may be switched on and a connection, particularly a RRC connection, with the communication network has been established.

The term "idle state" of the terminal may particularly denote a state of the terminal in which the terminal may be switched on, but does not have any established connections, particularly RRC connections, with the communication network.

According to the exemplary aspects of the invention, the communication network, particularly one or more nodes of the communication network, may determine which terminal may require to be controlled by a terminal specific inactivity timeout value, and may define a terminal specific inactivity timeout value such that the terminal may be informed to switch from its connected state into its idle state based on the determined inactivity timeout value.

Therefore, a power consumption of terminals for which the terminal specific inactivity timeout value may apply may be significantly reduced, since the terminal may be switched into its idle state earlier compared to usage of conventional inactivity timeout values. This may be particularly beneficial for terminals comprising a low power supply. Meanwhile, it will be avoided that a regular terminal showing frequent data traffic may be switched into its idle state too often such that signalling associated with a transition of such a terminal between the connected state and the idle state may be reduced.

Next, further exemplary embodiments of the method will be explained. However, these embodiments also apply to the node, and the computer program.

In particular, the step of informing the terminal or a network node may comprise sending and/or receiving one or more messages, for example messages in accordance with a S1Release procedure such as a Release Access Bearers request or response, a S1-AP UE context release, and a RRC connection release message, or message including a terminal inactivity indication as explained hereinafter.

At least one of the steps of determining whether the terminal is to be switched from its connected state into its idle state and the step of determining the specific inactivity timeout value may comprise determining a type of the terminal. Here, the term "type of a terminal" may particularly denote a class or category of the terminal. For example, a type of the terminal may correspond to a terminal category defined by a particular data rate. In particular, the step of determining the type of the terminal may comprise receiving a terminal type indication indicating the type of the terminal and using preconfigured data, for example a table, stored in the node, in order to determine the terminal specific inactivity timeout value. Thus a simple mechanism may be provided to control a power consumption of the terminal by the communication network.

The step of determining whether the terminal is to be switched from its connected state into its idle state may be based on characteristics of the terminal. Therefore, an accurate procedure may be defined for differentiating terminals which have to be switched from its connected state into its idle state using a terminal specific inactivity timeout value from those terminals to be switched from its connected state into its idle state using a regular inactivity timeout value of the radio access network. Further, a similar mechanism may be employed compared to the step of determining the terminal specific inactivity timeout value, thereby facilitating the method.

The characteristics of the terminal may comprise at least one of information indicating the terminal specific inactivity timeout value, information related to terminal capabilities of the terminal, information related to communication characteristics of the terminal, information related to subscription data of a subscriber associated with the terminal, and information related to a power consumption of the terminal. In particular, the information related to terminal capabilities may be obtained from the so-called International Mobile Equipment Identity (IMEI) or any other equipment identity information (e.g. a Globally Unique Temporary UE Identity (GUTI)) from which a terminal type may be derivable. In particular, the information related to communication characteristic of the terminal may correspond to a Quality of Service (QoS) Class Identifier (QCI) or a Radio Access Technology (RAT)/Frequency Selection Priority (RFSP). In particular, the information related to subscription information of the terminal may comprise information related to a service required for a subscriber of the terminal, for example a Short Messaging Service (SMS). Information related to a power consumption of the terminal may particularly comprise an energy consumption associated with a connected state of the terminal, an energy consumption associated with an idle state of the terminal, and/or an energy consumption per signalling message to be sent by the terminal. Thus, explicit or implicit signalling may be used in the communication network for transferring the information related to the characteristics of the terminal. Altogether, the step of determining whether the terminal is to be switched from its connected state into its idle state, the step of determining the specific inactivity timeout value and the step of determining a type of the terminal may be easily and accurately executed using combinations of the above described information.

In particular, one or more of the above described information may be sent during connection establishment, for example during a RRC Connection setup, between the terminal and a node of the radio access network. Alternatively or additionally, the information may be transferred during an establishment of the terminal context in the radio access network or subsequent to the establishment of the terminal context in the radio access network. The latter may apply for a control node of a packet switched domain of the communication network downloading the information to the node of the radio access network.

In particular, additionally or alternatively, preferences of an operator as to the terminal specific inactivity timeout value may be taken into account during the determination of the terminal specific inactivity timeout value of the terminal.

In particularly, additionally or alternatively, payload data of packets of data traffic of the terminal may be inspected for determining the terminal specific inactivity timeout value, since the content of the sent payload may indicate the type of terminal.

The information indicating the terminal specific inactivity timeout value may comprise the inactivity timeout value or a terminal type indication indicating the type of the terminal. Therefore, in a case in which the step of determining the specific inactivity timeout value may be based on the inactivity timeout value, the determining step may be a trivial. The latter may also apply to the terminal type indication and the step of determining the type of the terminal. In particular, the terminal specific inactivity timeout value and/or the terminal type indication may be received from the terminal, from an intermediate node of a packet-switched domain of the communication network, or a control node of the packet-switched domain of the communication network. Thus preconfigured information of a manufacturer of the terminal, a user of the terminal or the communication network may be employed for the determination steps, thereby facilitating the method.

In particular, explicitly transferring information indicating the terminal specific inactivity timeout value may employ a flag or an indication for the type of the terminal to be included in a conventional message or in a new message type.

The step of informing the terminal to switch from its connected state into its idle state may be automatically executed after an elapse of a time period of a length corresponding to the inactivity timeout value. Therefore, a very simple measure for switching the terminal from its connected state into its idle state may be provided. Conventional mechanisms defined in the node executing the step may be used with a modified inactivity timeout value. Further, the measure may be beneficial for terminals which may comprise a predictable traffic scheme or pattern for only short periods of time. For example, a possible use case associated with this measure may be a terminal sending few bytes of data every five minutes. A short inactivity timeout value, for example 15 seconds, may be sufficient for such a terminal, and the terminal may be automatically switched into its idle state after a time period of a length corresponding to the inactivity timeout value may have expired.

The method may be executed by a node of a radio access network of the communication network, for example an eNode B of a LTE radio access network or a Node B or an RNC of a Universal Mobile Telecommunications System (UMTS) Terrestrial Radio Access Network (UTRAN) based radio access network, or by an intermediate node of a packet switched domain of the communication network, for example a Signalling Gateway (SGW) of a packet-switched domain of a core network of the communication network. For example, in the case of the eNode B executing the method, the step of determining the terminal specific inactivity timeout value, the step of determining whether the terminal is to be switched from its connected state into its idle state and/or the step of determining a type of the terminal may be based on a type of the terminal, since technical capabilities and/or a configuration of the terminal and/or subscription data associated with the subscriber of the terminal may not be (fully) known in the eNode B.

The method may further comprise, subsequent to informing the terminal to switch into its idle state, monitoring for a predetermined verification time period whether the terminal may comprise its connected state, and adapting the inactivity timeout value, if the terminal may comprise its connected state within the predetermined verification time period. In particular, it may be regarded as an indication that the inactivity timeout value may be too short for a terminal, if the terminal may switch again into its connected state within the verification time period. This measure may be particularly beneficial in connection with the step of automatically switching the terminal from its connected state into its idle state, in order to cope with an actual data traffic activity of the terminal. Therefore it may be avoided that a terminal comprising ongoing data traffic activity may be switched into its idle state as the predicted data traffic scheme or pattern of the terminal may not hold in reality. It may be also avoided that a terminal sending uplink data may generate a service request towards the communication network and that a terminal receiving downlink data may generate a paging procedure by the communication network. Therefore, signalling load in the communication network may be reduced and unnecessary power consumption of the terminal associated with frequent transitions of the terminal between its connected state and its idle state may be decreased, in particular for cases in which the terminal may show a data traffic deviating from its predicted data traffic scheme.

In particular, a time length of the verification time period may be preconfigured in the node executing the monitoring step. In particular, the time length may depend on the data traffic pattern of the terminal, or may be equal to the time length corresponding to the inactivity timeout value after which elapse the terminal may be automatically switched from its connected state to its idle state, or may be a function of the aforementioned time period.

In particular, the adapting of the inactivity timeout value may be manually executed on a per request basis by the communication network, for example by an Operation and Maintenance System (O&MS), or may be automatically executed, for example in a case in which the number of positive verifications that the terminal may comprise again its connected state again may be above a defined threshold value.

The method may be executed by a control node of a packet switched domain of the communication network. In this case, the informing of the terminal to switch into its idle state may correspond to a S1 Release procedure initiated by the control node by sending a respective message to an intermediate node of the packet-switched domain of the communication network. In particular, implementation of the method in an already existing communication network architecture may be facilitated, since control nodes in the communication network may be usually dedicated to one vendor supplying the network architecture, whereas the nodes of the radio access network may be different from one another as those nodes are associated with different vendors supplying the network architecture. Further, the number of control nodes in the communication network is usually low and significantly lower compared to the number of the nodes of the radio access network.

In particular, the control node may start a timer instantly when the terminal may comprise its connected state, and may then wait for the elapse of the time period of a length corresponding to the inactivity timeout value for automatically switching the terminal to its idle state.

The method may further comprise sending the determined inactivity timeout value to an intermediate node of a packet switched domain of the communication network, and receiving from the intermediate node a terminal inactivity indication indicating that a verification time period of a length corresponding to the inactivity timeout value has expired without monitored data traffic of the terminal. In particular, both measures may be executed by a control node of the packet-switched domain of the communication network. Therefore, the intermediate node may be informed or instructed to conditionally initiate a transition of the terminal from its connected state to its idle state, i.e. to initiate the transition of the terminal after an elapse of the verification time period without monitored data traffic. For example, the intermediate node may be instructed to conditionally release access bearers associated with the terminal. As described above, a transition of the terminal into its idle state may be avoided for those cases in which the terminal may show data traffic.

In particular, the inactivity timeout value may be sent immediately when the terminal may become connected to the control node, after an elapse of a timeout or in advance at connection setup. In case of instantly sending the inactivity timeout value when connecting the terminal, the inactivity timeout value may be sent to the intermediate node in a conventional message, for example in a Modify Bearer Request message or Create Session Request message. A respective acknowledgment response of the intermediate node may be sent in a Modify Bearer Response message or Create Session Response message.

In particular, the intermediate node may monitor for a predetermined verification time period of the time length corresponding to the terminal specific inactivity timeout value the data traffic of the terminal. Here, the intermediate node may start monitoring the data traffic instantly at reception of the inactivity timeout value or may start the monitoring later. For example, the intermediate node may store the inactivity timeout value and may start the monitoring when the terminal becomes connected to the communication network, particularly when the terminal switches into its connected state, but before the control node may have signalled the inactivity timeout value again.

In particular, the intermediate node may send an acknowledgment of the received inactivity timeout value instantly upon reception of the inactivity timeout value or together with the terminal inactivity indication in one message or in separate subsequent messages.

In particular, the terminal inactivity indication may be only sent in case of no data traffic has been monitored.

In particular, the terminal inactivity indication may be sent in a message different of message types defined in accordance with the Si release procedure.

In particular, selecting the intermediate node based on a specific Access Point Name (APN) or other information avoids sending the inactivity timeout value to an intermediate node not being capable of monitoring the data traffic.

The method may further comprise monitoring data traffic of the terminal, wherein the step of determining the terminal specific inactivity timeout value may be executed based on the monitored data traffic. Therefore, the terminal specific inactivity timeout value may be further optimized to correspond to a timely variable value dedicated to actual data traffic of the terminal. Therefore, power consumption control of the terminal may be further optimized. The step of monitoring the data traffic may be executed by the node of the radio access network or the intermediate node of the packet-switched domain, for example the SGW or a Packet Data Network (PDN) Gateway (PGW) or by a stand-alone node for example on the Gi interface. In the case in which the PGW may monitor the data traffic, and may determine the terminal specific inactivity timeout value, the determined inactivity timeout value may be signalled via the SGW to the control node of the packet switched domain, for example the MME.

The method may further comprise determining a data traffic scheme based on the monitored data traffic, wherein the step of determining the terminal specific inactivity timeout value may be executed based on the determined data traffic scheme. Therefore, the terminal specific inactivity timeout value may be accurately determined taking into account statistics of actual or real data traffic of the terminal. In particular, the terminal specific inactivity timeout value may correspond to a trigger initiating the transition of the terminal into its idle state slightly after a typical traffic event, for example in a traffic burst identified in the data traffic scheme.

Here, the term "traffic burst" may particularly denote a data transfer of a particular time length and separated in time intervals. A time length of the traffic burst and a time length of between traffic events in the traffic burst may depend on a content of the data sent in the traffic burst.

The method may further comprise identifying data traffic events consisting of data packets, wherein the step of determining the inactivity timeout value may comprise selecting an inactivity timeout value which is higher than (most of) the inter-arrival times of the data packets within a traffic event. For example, a traffic event can be identified by defining a threshold in the node identifying the average time difference between packet arrivals and taking into account that most of the determined time differences may be above or below the threshold and relatively few identified time differences may be near the threshold.

The step of determining the inactivity timeout value may be executed together with the step of monitoring the data traffic such that online traffic monitoring may be employed for the determination of the terminal specific inactivity timeout value. Alternatively, the step of determining the inactivity timeout value may be executed at a later time compared to the step of monitoring the data traffic such that offline traffic monitoring may be employed for determining the terminal specific inactivity timeout value.

In particular, the inactivity timeout value may be stored as configuration data in the node of the communication network or may be retrieved from a data base of the communication network or may be stored in a subscriber server, particularly a Home Subscriber Server (HSS) of the communication network to be downloaded to the node of the communication network. For example, the latter case may apply to a situation in which the control node of the packet-switched domain of the communication network may download the terminal specific inactivity timeout value together with subscription data. Additionally or alternatively, a number of predetermined fixed timeout values may be stored in the node. When determining the terminal type one of these stored terminal specific inactivity timeout values may be associated with the determined terminal type, and a terminal specific inactivity timeout value may be assigned to the terminal.

Next, further exemplary embodiments of the node will be explained. However, these embodiments also apply to the method, and the computer program.

In particular, the node may be configured to, particularly automatically, execute one or more steps of the above described method.

The node may be configured as a node of a radio access network of the communication network, an intermediate node of a packet switched domain of the communication network or a control node of the packet switched domain of the communication network.

Referring to FIG. 1, a method of controlling operational states of a terminal according to a first exemplary embodiment of the invention will be explained. The method is associated with a communication network 100 to which the terminal 102 is attached. The communication network 100 comprises a node 104 of a packet-switched radio access network, for example an eNode B of a LTE radio access network, a control node 106 of a packet-switched domain of the communication network 100, for example a MME, and an intermediate node 108 of the packet-switched domain, for example a SGW. The terminal 102 is in its connected state. Another operational state of the terminal 102 is an idle state of the terminal 102 that is used to conserve power by limiting the network activity to only periodic scanning; this state is appropriate for situations with relatively long communication inactivity times and/or with only sporadic communication.

In a first step 110 of the method, the terminal 102 sends information related to characteristics of the terminal to the eNode B 104. The information related to the characteristics of the terminal 102 may comprise a terminal type information or an explicit inactivity timeout value which may be stored in the terminal 102. In a next step 112, the eNode B 104 determines whether the terminal 102 is to be switched from its connected state into its idle state using a terminal specific inactivity timeout value based on the information received in the step 110. In the affirmative, in a next step 114, the eNode B 104 determines the inactivity timeout value to be used for the terminal 102 based on the information received in the step 110.

Next, in a step 116, the eNode B 104 starts an inactivity timeout timer having a time length corresponding to the received inactivity timeout value, and waits for a time period during which the inactivity timeout timer is running. Thereupon, the eNode B 104 automatically starts a procedure to switch the terminal 102 from its connected state into its idle state in response to the expiration of the inactivity timeout timer by sending a Release Access Bearers Request to the MIME 106. Next, in a step 120, the MIME 106 sends a Release Access Bearers request to the SGW 108, which in turn acknowledges the released access bearers by sending a Release Access Bearers Response message to the MME 106. Next, in a step 124, the MME 106 sends a S1-AP UE context release command to the eNode B 104 which sends in a step 126 a RRC Connection Release request to the terminal 102. Thus, the terminal 102 is informed to switch from its connected state into its idle state. Thereupon, in a step 128, the eNode B 104 sends a S1-AP UE context release complete message to the MIME 106, in order to acknowledge the released terminal context associated with the terminal 102.

The steps 112 to 116 can also be executed by an intermediate node of the packet switched domain, for example the SGW 108. In such a case, the SGW 108 may inform the MME 106 about expiration of the inactivity timeout timer, which may correspond to inform the terminal 102 to switch into its idle state, and the method may continue with the step 118.

Figure 2:
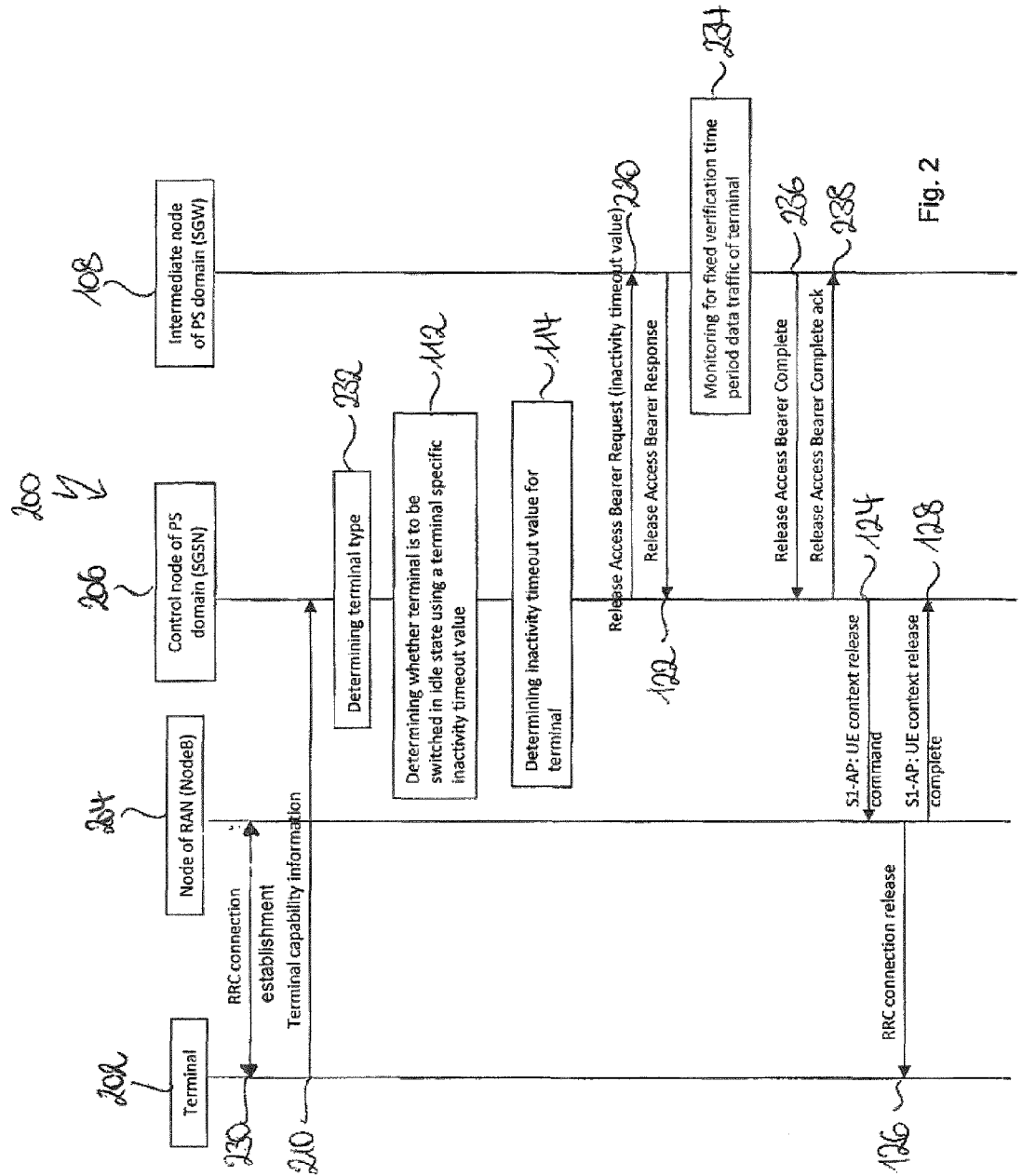
FIG. 2 is a flow diagram illustrating a method of controlling operational states of a terminal according to a second exemplary embodiment of the invention.

Referring to FIG. 2 a method of controlling operational states of a terminal according to a second exemplary embodiment of the invention will be explained. A communication network 200 associated with the method is similarly designed compared to the communication network 100. However, the radio access network is UTRAN, and a node 204 of the radio access network is a RNC. A control node 206 of a packet-switched domain of the communication network 200 is a SGSN. The terminal 202 is a machine device terminal comprising limited power supply and infrequent data traffic.

In a first step 230 of the method, an RRC connection establishment is performed between the terminal and the Node B 104, and switches into its connected state. Next, in a step 210, the terminal 202 sends information related to characteristics of the terminal 202, which information corresponds to terminal capability information of the terminal 202. This terminal capability information could also be derived in the core network from an identity of the terminal such as an IMEI of the terminal 202, however can be a GUTI of the terminal 202 or the IMSI of the terminal 202. Next, in a step 232, the SGSN 206 determines a type of the terminal 202, and identifies the type to be a machine device. Next, steps 112 and 114 illustrated in FIG. 1 are executed. The SGSN 106 has a list of stored terminal specific inactivity timeout values each of which being associated with a terminal type. Therefore the determined terminal specific inactivity timeout value is identical for all terminals 202 of the same type.

Next, in a step 220, the SGSN 206 sends a Release Access Bearers request to the SGW 108, which message includes the determined terminal specific inactivity timeout value. This step 220 corresponds to the initiation of an informing procedure for informing the terminal 202 to switch into its idle state. Next, in a step 122, the SGW 108 informs the SGSN 206 about the reception of the Release Access Bearers request by sending a Release Access Bearer response message. Next, in a step 234, the SGW 108 monitors for a predetermined verification time period a data traffic of the terminal 202 based on the received inactivity timeout value. The verification time period has a time length corresponding to the received inactivity timeout value. In a case in which no data traffic or an amount of data traffic below a certain threshold has been monitored during the verification time period, respectively, the SGW 108 sends an inactivity indication indicating that the verification time period has expired without monitored data traffic of the terminal 202. The inactivity indication is included in a Release Access Bearers Complete message in a step 236 to the SGSN 206. Thus, the SGSN 206 is informed about the lack of data traffic or the minimal data traffic during the verification time period, respectively. Next, in a step 238, the SGSN 206 sends a Release Access Bearers Complete acknowledgement to the SGW 108. Further, upon reception of the message in the step 238, the SGW 108 drops the Access Bearers associated with the terminal 202. Thereupon, steps 124 to 128 illustrated in FIG. 1 are executed accordingly (but by means of RANAP instead of S1-AP).

Figure 3:
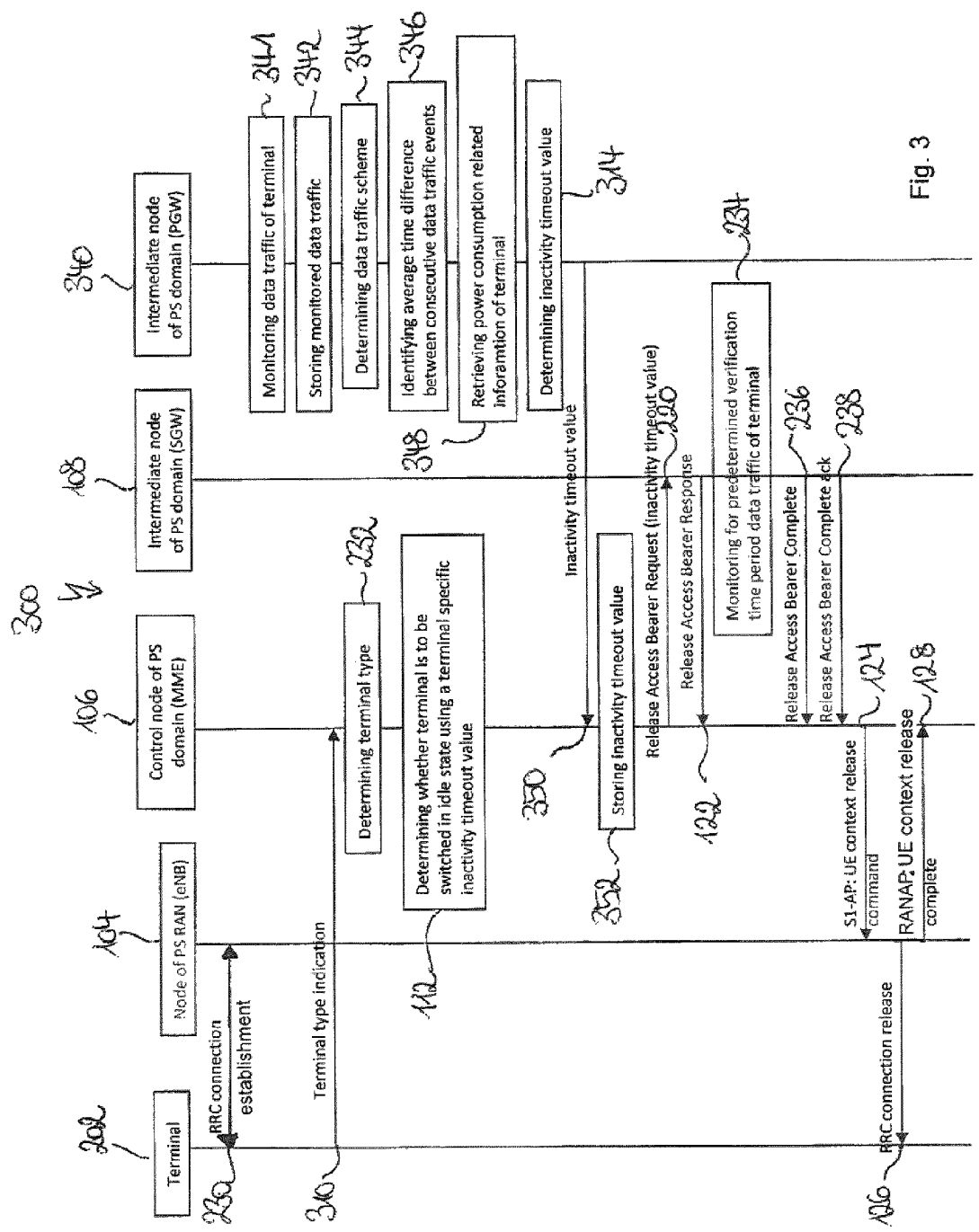
FIG. 3 is a flow diagram illustrating a method of controlling operational states of a terminal according to a third exemplary embodiment of the invention.

Referring to FIG. 3, a method of controlling operational states of a terminal 202 according to a third exemplary embodiment of the invention will be explained. The communication network 300 associated with the method is identical to the communication network 100, and further comprises an intermediate node of the packet-switched domain, for example a PGW 340. The terminal 202 is configured as the machine device terminal described on FIG. 2.

In a first step 230 of the method, an RRC connection establishment is performed between the terminal 202 and the eNode B 104. Next, in a step 310, the terminal 202 sends information related to terminal characteristics of the terminal 202 to the MIME 106. The information comprises a terminal type indication indicating the machine device-type of the terminal 202. Next, steps 232 and 112 are executed, as explained with reference to FIGS. 2 and 1, respectively.

In step 230, the PGW 340 monitors data traffic of the terminal in a step 340. In a subsequent step 342, the PGW 340 stores information related to the monitored data traffic, and, after some time, determines in a step 344 a data traffic scheme of the terminal 202. Thereupon, in a step 346, the PGW 340 identifies time differences between and within conductive data traffic events, i.e. data traffic bursts. Next, in a step 348, the PGW 340 retrieves information related to a power consumption of the terminal 202, which comprise fixed power consumption values of the terminal type for particular signalling events. Next, in a step 314, the PGW 340 determines a terminal specific inactivity timeout value, which is sent in a step 350 to the MME 106.

Next, in a step 352, the MIME 106 stores the inactivity timeout value. Next, steps 220, 122, 234, 236, 238, 124, 126 and 128 as explained with reference to FIGS. 1 and 2, respectively are executed.

The above described monitoring/determining steps might take place in advance to a connection establishment; in other words, once the monitoring is done and the timeout is determined and configured, such timeout value might be applied afterwards when the terminal connects next time.

It is noted that the MME 106 may further execute the step 114 illustrated in FIGS. 1 and 2, namely the determination of the inactivity timeout value between the steps 350 and 352 or between the steps 352 and 220, respectively. Such a determination step may correspond to a trivial action of the MME 106, and may be also omitted.

Further, the PGW 340 may also execute the steps 341 to 346 for other terminals comprising the same type compared to the type of the terminal 202. Further, the determination in the step 314 may be executed simultaneously to the step 341, i.e. the determination of the inactivity timeout value may be based on online monitoring of the data traffic instead of offline monitoring of the data traffic.

Figure 4:
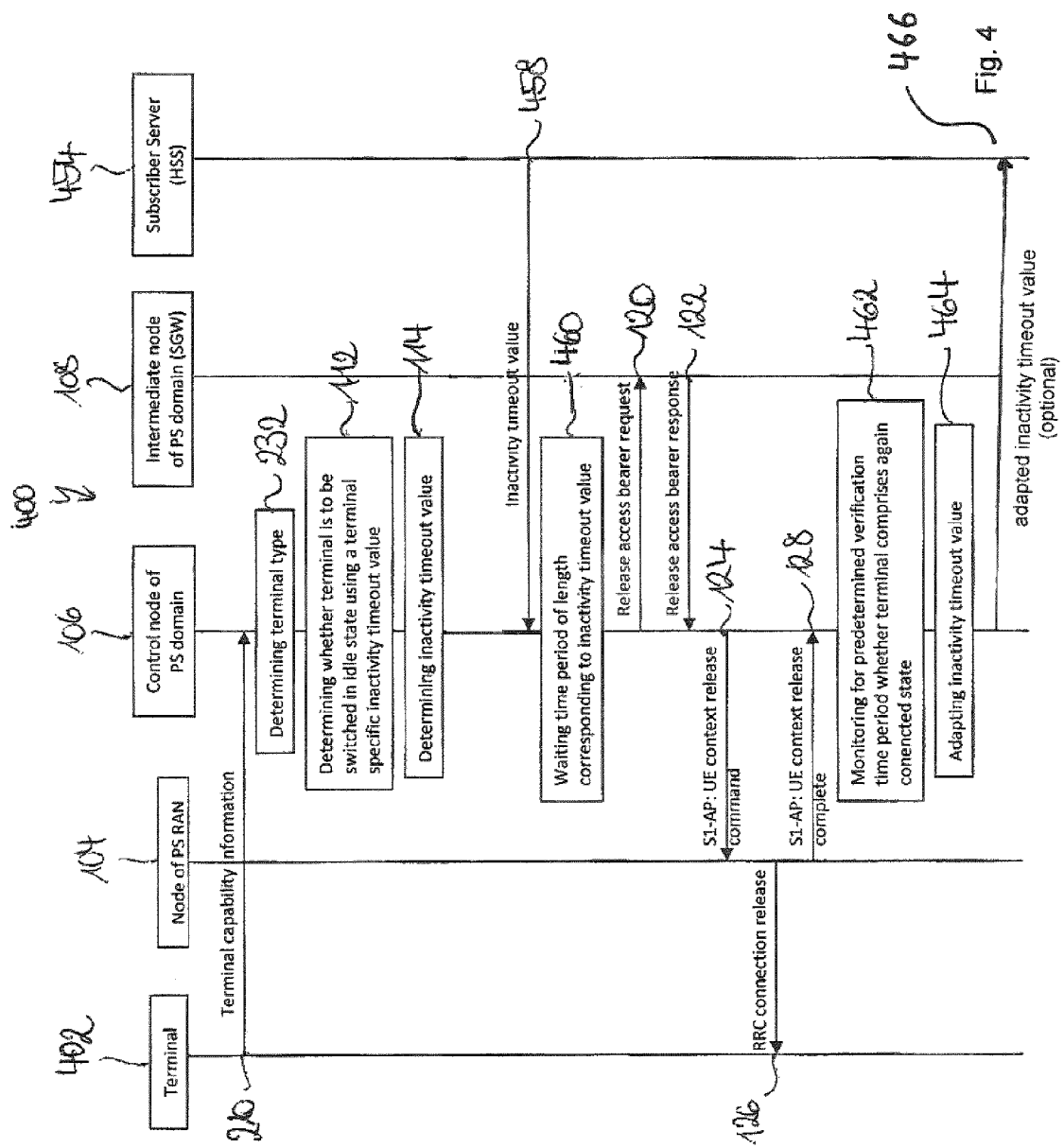
FIG. 4 is a flow diagram illustrating a method of controlling operational states of a terminal according to a fourth exemplary embodiment of the invention.

Referring to FIG. 4, a method of controlling operational states of a terminal according to a fourth exemplary embodiment of the invention will be explained. A communication network 400 associated with the method is identical to the communication network 100, and further comprises a subscriber server 454, a HSS. The terminal 402 belongs to a terminal type which benefits from a quicker transition to idle mode. The terminal 402 comprises its connected state.

The method starts, and steps 210, 232, 112, 114 as explained with reference to FIGS. 1 to 3 are executed.

Later, in a step 458, the MIME 106 may retrieve the terminal specific inactivity timeout value from the HSS 454 together with subscription data of a subscriber associated with the terminal 402. Next, in a step 460, the MME 106 waits for a time period of a length corresponding to the received inactivity timeout value. The step 460 is similar to the step 116 of FIG. 1. Afterwards, the MME 106 automatically informs the terminal 402 to switch into its idle state by sending a Release Access Bearer Request message in a step 120. Thereupon, steps 122, 124, 126, 128 illustrated in FIGS. 1 to 3 are executed. Next, in a step 462, the MIME 106 monitors for a predetermined verification time period whether the terminal 402 comprises again its connected state. For example, the MME 106 may monitor an connection setup request from the terminal 402. Next, in a step 464, the MME 106 automatically adapts the inactivity timeout value in a case in which the terminal 402 comprises again its connected state. Alternatively, the step 464 may be omitted, if the terminal 402 remains in its idle state.

Optionally, in a step 466, the MME 106 sends the adapted inactivity timeout value to the HSS 454 for further storage.

Figure 5:
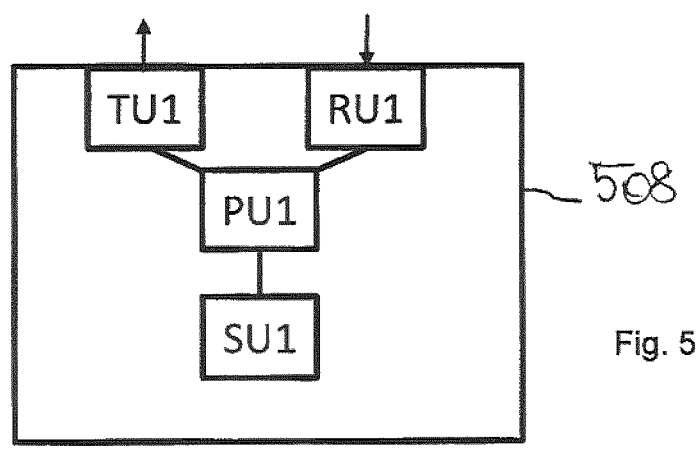
FIG. 5 is a block diagram illustrating a node of a communication network for controlling operational states of a terminal according to an exemplary embodiment of the invention.

Referring to FIG. 5, a node 508 of a communication network for controlling operational states of a terminal is illustrated. The terminal is connected to a communication network. The operational states comprise a connected state and an idle state. The node 508 comprises a determining unit configured to determine whether the terminal is to be switched from its connected state into its idle state using a terminal specific inactivity timeout value. The determining unit is further configured to determine the terminal specific inactivity timeout value of the terminal depending on characteristics of the terminal. The node 508 also comprises an informing unit configured to inform the terminal to switch from its connected state into its idle state based on the determined inactivity timeout value.

The determining unit is part of a processing unit PU1 of the node. The processing unit PU1 is configured to process information related to a method of controlling operational states of a terminal as described above. The informing unit is part of a sending unit TU1 of the node 508. The sending unit TU1 is configured to send information related to the aforementioned method.

The node 508 further comprises a reception unit RU1 configured to receive information related to the aforementioned method, and a storage unit SU1 configured to store information relate to the aforementioned method.

The node is configured as an intermediate node of the communication network, for example a SGW.

The node 508 further comprises a monitoring unit configured to monitor data traffic of the terminal, as described with reference to the step 341 of FIG. 3. The monitoring unit is part of the reception unit RU1, and the storage unit SU1. The processing unit PU1 is also configured to determine a data traffic scheme and to identify average time differences between two consecutive data traffic events.

A relationship between the functionally based units and actual, physical units of the node 508 may be different from the above described embodiment. For example, the informing unit may be part of the processing unit PU1 and the sending unit TU1.

While the invention has been illustrated and described in detail in the drawings and foregoing description, such illustration and description are to be considered illustrative or exemplary and not restrictive; the invention is not limited to the disclosed embodiments, and in particular not to those embodiments in accordance with the cited 3GPP TSs. Other variations to the disclosed embodiments can be understood and effected by those skilled in the art in practicing the claimed invention, from a study of the drawings, the disclosure, and the appended claims. In the claims, the word "comprising" does not exclude other elements or steps, and the use of indefinite articles "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method of controlling a connection of a terminal being attached to a communication network, wherein a connectivity change from a connected mode into a non-connected mode is performed as a result of monitoring a data transmission activity with respect to the terminal, comprising:
    obtaining a terminal class according to a technical capability, a configuration and/or a subscription associated to the terminal,
    determining the inactivity timeout value according to the terminal class associated to the terminal, and
    changing the connectivity from the connected mode into the non-connected mode if a monitored time without data transmission activity exceeds the obtained inactivity timeout value,
    wherein the inactivity timeout value is modified or adapted in an instance where a connectivity change back to the connected mode is detected with respect to the terminal within a first predetermined verification time period after the connectivity has changed from the connected mode to the non-connected mode.

2. The method according to claim 1, further comprising determining whether a connectivity change from the connected mode into the non-connected mode shall be performed in dependency on the terminal class or not.

3. The method according to claim 1, wherein changing the connectivity from the connected mode into the non-connected mode comprises releasing a data bearer between the terminal and the communication network.

4. The method according to claim 1, wherein changing the connectivity from the connected mode into the non-connected mode comprises sending a release message to the terminal so that the terminal may change its state from connected mode to idle mode.

5. The method according to claim 1, further comprising adapting or modifying the inactivity timeout value in dependency on the data transmission activity with respect to the terminal.

6. The method according to claim 5, comprising receiving from a service gateway node a terminal inactivity indication indicating that a certain time has expired without monitored data traffic of the terminal.

7. The method according claim 6, wherein the inactivity timeout value is further modified or adapted,
    no connectivity change back to the connected mode is detected with respect to the terminal within a second predetermined verification time period after the connectivity has changed from the connected mode to the non-connected mode.

8. The method of claim 7, wherein modifying or adapting the inactivity timeout value comprises at least one of:
    increasing the inactivity timeout value if the connectivity change back has been detected and if the value is below a maximum threshold, and
    decreasing the inactivity timeout value if the connectivity change back has not been detected and if the value is above a minimum threshold.

9. The method according to claim 1, wherein terminal class associated to the terminal comprises information of at least one of:
    a data transmission and/or reception capability,
    a subscription information associated to the terminal, e.g. a granted quality of service,
    a data transmission and/or reception configuration,
    a power capability, and
    a power configuration.

10. The method according to claim 1, comprising detecting a data traffic scheme based on the monitored data traffic, wherein the inactivity timeout value is determined in dependency on the detected data traffic scheme.

11. The method according to claim 1, further comprising identifying a time difference between consecutive packets of a data traffic events, wherein determining the inactivity timeout value comprises determining the inactivity timeout value in dependency of the identified time differences.

12. The method according to claim 11, wherein the inactivity timeout value is determined to be:
    equal or higher than any of the identified time differences,
    equal or higher than any of a subset of the identified time differences.

13. A node for controlling a connection of a terminal being attached to a communication network, wherein a connectivity change from a connected mode into a non-connected mode is performed by monitoring a data transmission activity with respect to the terminal,
    wherein the node comprises one or more processors configured to:
    obtain a terminal class according to a technical capability, a configuration and/or a subscription associated to the terminal,
    obtain an inactivity timeout value according to the obtained terminal class associated to the terminal, and
    change the connectivity from the connected mode into the non-connected mode if a monitored time without data transmission activity exceeds the obtained inactivity timeout value,
    wherein the inactivity timeout value is modified or adapted in an instance where a connectivity change back to the connected mode is detected with respect to the terminal within a first predetermined verification time period after the connectivity has changed from the connected mode to the non-connected mode.

14. The node of claim 13, wherein the one or more processors are further configured to inform the terminal to switch from a connected terminal state into an idle terminal state.

15. The node of claim 14, being configured as a node of a radio access network of the communication network, an intermediate node of a packet switched domain of the communication network or a control node of the packet switched domain of the communication network.

16. A non-transitory computer readable medium having stored thereon, a set of instructions that, when executed by a processor, is configured to carry out a method according to claim 1.

17. The node of claim 13, wherein a time length of the verification time period is determined based on the data traffic pattern of the terminal.

* * * * *